US011976716B2

(12) United States Patent
Harshman et al.

(10) Patent No.: US 11,976,716 B2
(45) Date of Patent: May 7, 2024

(54) SEAL ASSEMBLY FOR A GRADING MACHINE

(71) Applicant: Caterpillar Inc., Peoria, IL (US)

(72) Inventors: Nathaniel K. Harshman, Sullivan, IL (US); Benjamin J. Kovalick, Decatur, IL (US); Nikhil Sharma, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 977 days.

(21) Appl. No.: 16/557,609

(22) Filed: Aug. 30, 2019

(65) Prior Publication Data

US 2021/0062908 A1 Mar. 4, 2021

(51) Int. Cl.
*E02F 9/12* (2006.01)
*E02F 3/815* (2006.01)
*E02F 9/20* (2006.01)
*F16H 57/029* (2012.01)
*E02F 3/76* (2006.01)
*E02F 3/84* (2006.01)

(52) U.S. Cl.
CPC ......... *F16H 57/029* (2013.01); *E02F 3/8152* (2013.01); *E02F 9/202* (2013.01); *E02F 3/764* (2013.01); *E02F 3/844* (2013.01)

(58) Field of Classification Search
CPC .. F16H 57/029; F16H 57/031; F16H 57/0431; F16H 57/02; F16H 1/16; E02F 3/8152; E02F 9/202; E02F 3/764; E02F 3/844; E02F 9/12; E02F 3/80; E02F 3/96; E02F 3/815; E02F 3/8157; E02F 3/961; B66C 23/84; F16C 41/00; F16C 33/58; F16C 2361/61; F16C 2350/26; F16C 2300/14; Y10T 74/19828
See application file for complete search history.

(56) References Cited

U.S. PATENT DOCUMENTS

| 739,383 | A | * | 9/1903 | Bunnell | ................... E02F 3/765 172/793 |
| 2,034,141 | A | * | 3/1936 | Gustafson | ............. E02F 3/7636 74/15.84 |
| 2,089,730 | A | * | 8/1937 | Brown | .................... E02F 3/764 172/796 |

(Continued)

FOREIGN PATENT DOCUMENTS

| CN | 104652511 A | 5/2015 |
| CN | 105190304 A | 12/2015 |
| JP | H074442 | 1/1995 |

OTHER PUBLICATIONS

Chinese Patent Office First Office Action for China Patent Appln. No. 202010863611.4, dated Sep. 15, 2023 (7 pgs).

*Primary Examiner* — Edwin J Toledo-Duran
(74) *Attorney, Agent, or Firm* — Bookoff McAndrews, PLLC (57) ABSTRACT

Disclosed is a seal assembly for a grading machine. The grading machine may include a machine body, a blade assembly, and a circle assembly supporting the blade assembly. The circle assembly may include a circle having a plurality of gear teeth. The grading machine may also include a drawbar assembly connecting the circle assembly to the machine body. The seal assembly may include a non-metallic seal component extending circumferentially around an inner circumference of the circle assembly for sealing the plurality of gear teeth.

20 Claims, 6 Drawing Sheets

(56) References Cited

U.S. PATENT DOCUMENTS

| | | | | |
|---|---|---|---|---|
| 2,313,084 | A * | 3/1943 | Manly | B66C 23/84 104/46 |
| 2,928,381 | A * | 3/1960 | MacDonald | E02F 3/764 91/186 |
| 3,273,232 | A * | 9/1966 | Royer | E02F 9/121 29/402.13 |
| 3,369,672 | A * | 2/1968 | Lorence | B62D 55/062 475/83 |
| 3,470,967 | A | 10/1969 | Page et al. | |
| 3,593,806 | A * | 7/1971 | Gurries | E02F 3/764 172/741 |
| 3,705,502 | A * | 12/1972 | Padgett | F16D 3/185 464/17 |
| 3,712,384 | A * | 1/1973 | Fisher | E02F 3/764 172/796 |
| 3,819,018 | A * | 6/1974 | Muller | E02F 9/126 172/796 |
| 3,888,357 | A * | 6/1975 | Bauer | F16C 33/60 212/175 |
| 3,907,041 | A * | 9/1975 | Manor | E02F 3/844 172/705 |
| 3,924,689 | A * | 12/1975 | Manor | E02F 9/2203 172/260.5 |
| 3,989,112 | A * | 11/1976 | Cole | E02F 3/764 188/74 |
| 4,015,669 | A * | 4/1977 | Cole | E02F 3/80 74/606 R |
| 4,058,174 | A | 11/1977 | Atherton et al. | |
| 4,084,644 | A * | 4/1978 | Cole | E02F 3/764 172/796 |
| 4,099,577 | A * | 7/1978 | Beckham | E02F 3/764 172/796 |
| 4,185,700 | A * | 1/1980 | Atherton | E02F 3/764 74/606 R |
| 4,198,189 | A * | 4/1980 | Brudi | B66F 9/125 475/179 |
| 4,206,818 | A * | 6/1980 | Beckham | E02F 3/764 172/796 |
| 4,243,355 | A * | 1/1981 | Brudi | B66F 9/125 475/14 |
| 4,554,748 | A * | 11/1985 | Nixon, Jr. | F16J 15/16 277/545 |
| 4,825,746 | A * | 5/1989 | Herner | F15B 15/082 91/44 |
| 5,667,020 | A * | 9/1997 | Palmer | E02F 3/765 74/448 |
| 5,996,706 | A * | 12/1999 | Gibbs | E02F 3/764 172/792 |
| 6,164,829 | A * | 12/2000 | Wenzel | F16C 11/0638 403/135 |
| 6,851,485 | B2 * | 2/2005 | Maeda | E02F 3/764 172/796 |
| 7,165,771 | B2 * | 1/2007 | Beichl | F16J 15/3288 277/421 |
| 7,575,068 | B2 * | 8/2009 | Stubben | E02F 3/7645 172/445.2 |
| 8,376,367 | B2 * | 2/2013 | Beichl | F16J 15/3288 277/355 |
| 8,464,803 | B2 * | 6/2013 | Greuel | E02F 3/765 172/795 |
| 8,746,362 | B2 * | 6/2014 | Bindl | E02F 9/202 172/795 |
| 8,869,910 | B2 * | 10/2014 | Greuel | E02F 3/844 172/792 |
| 9,228,316 | B2 * | 1/2016 | Staade | E02F 3/7654 |
| 9,279,477 | B2 * | 3/2016 | Hein | F16H 57/023 |
| 9,644,341 | B2 * | 5/2017 | Yoshimura | E02F 3/7645 |
| 10,281,026 | B2 * | 5/2019 | DiSabatino | F16H 57/0423 |
| 10,399,830 | B2 * | 9/2019 | De Groot | B66C 23/52 |
| 10,745,885 | B2 * | 8/2020 | Stoops | F15B 13/027 |
| 10,975,951 | B2 * | 4/2021 | Klaehn | H02K 7/088 |
| 11,208,908 | B2 * | 12/2021 | Feldmann | F16J 15/3216 |
| 2003/0066370 | A1 * | 4/2003 | Russ | B66C 23/84 74/606 R |
| 2004/0244521 | A1 * | 12/2004 | Russ | B66C 23/84 74/425 |
| 2004/0256807 | A1 * | 12/2004 | Bhate | F16J 15/3288 277/355 |
| 2005/0147518 | A1 * | 7/2005 | Nicolas | F04C 13/002 418/206.1 |
| 2005/0166717 | A1 * | 8/2005 | Owoc | B25B 13/44 81/58.4 |
| 2006/0042810 | A1 * | 3/2006 | Pecchio | E02F 3/764 172/781 |
| 2008/0110651 | A1 * | 5/2008 | Stubben | E02F 3/764 172/781 |
| 2011/0247846 | A1 * | 10/2011 | Greuel | E02F 3/844 172/781 |
| 2012/0156911 | A1 * | 6/2012 | Smith | H01R 13/622 439/323 |
| 2014/0338933 | A1 * | 11/2014 | Harris | E02F 3/7645 172/1 |
| 2015/0135866 | A1 * | 5/2015 | Staade | E02F 3/764 74/89.18 |
| 2015/0329158 | A1 * | 11/2015 | Busley | B62D 55/305 180/9.1 |

\* cited by examiner

SEAL ASSEMBLY FOR A GRADING MACHINE

TECHNICAL FIELD

The present disclosure relates generally to grading machines, and more particularly, to a seal assembly for a grading machine.

BACKGROUND

Grading machines, such as motor graders, are typically used to cut, spread, or level materials that form a ground surface. To perform such earth sculpting tasks, grading machines include a blade, also referred to as a moldboard or implement. The blade moves relatively small quantities of earth from side to side, in comparison to a bulldozer or other machine that moves larger quantities of earth. Grading machines are frequently used to form a variety of final earth arrangements, which often require the blade to be positioned in different positions and/or orientations depending on the sculpting task and/or the material being sculpted. The different blade positions may include the blade pitch or the blade cutting angle. A circle drive may control a position of a circle coupled to the blade, and thus adjust the blade cutting angle. For example, the circle may include gear teeth engaged with a gear of the circle drive for rotating the circle. Debris, such as dirt, rocks, or grease, may accumulate in, and/or damage, the gear teeth.

U. S. Patent Application Publication No. 2015/0135866, published on May 21, 2015 ("the '866 publication"), describes a sealed guard for a motor grader. The '866 publication includes a circle having a circle gear connected to a frame for rotation relative to the frame. A circle drive mounted to the frame may include a pinion engaging the circle gear to rotate the circle relative to the frame. The guard of the '866 publication may depend from the frame so as to provide a radial cover of the circle gear and the pinion. The guard may be, for example, sheet metal. A lip seal is located between the guard and the pinion to provide a sealed connection between the guard and the circle for inhibiting passage of contamination between the guard and the circle. However, the guard of the '866 publication may not effectively seal the circle teeth from debris or grease. Further, the guard may become dented or damaged due to debris (e.g., rocks) striking or colliding with the guard.

The seal assembly for a grading machine of the present disclosure may solve one or more of the problems set forth above and/or other problems in the art. The scope of the current disclosure, however, is defined by the attached claims, and not by the ability to solve any specific problem.

SUMMARY

In one aspect, a grading machine is disclosed. The grading machine may include: a machine body; a blade assembly; a circle assembly supporting the blade assembly and including a circle having a plurality of gear teeth; a drawbar assembly connecting the circle assembly to the machine body; and a seal assembly including a non-metallic seal component extending circumferentially around an inner circumference of the circle assembly for sealing the plurality of gear teeth.

In another aspect, a circle assembly is disclosed. The circle assembly may include: a circle having a plurality of gear teeth; and a seal assembly including a non-metallic seal component extending circumferentially around an inner circumference of the circle assembly for sealing the plurality of gear teeth, wherein the non-metallic seal component is compressed axially to a predetermined height when the seal assembly is mounted.

In yet another aspect, a seal assembly for a grading machine is disclosed. The seal assembly may include: a non-metallic seal component shaped to extend circumferentially around an inner circumference of a circle assembly of the grading machine; and a cover plate shaped to extend circumferentially around the inner circumference of the circle assembly of the grading machine and configured to be mounted on an end of the non-metallic seal component.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "ground surface" is broadly used to refer to all types of surfaces or materials that may be worked in material moving procedures (e.g., gravel, clay, sand, dirt, etc.) and/or can be cut, spread, sculpted, smoothed, leveled, graded, or otherwise treated. In this disclosure, unless stated otherwise, relative terms, such as, for example, "about," "substantially," and "approximately" are used to indicate a possible variation of ±10% in the stated value.

Figure 1:
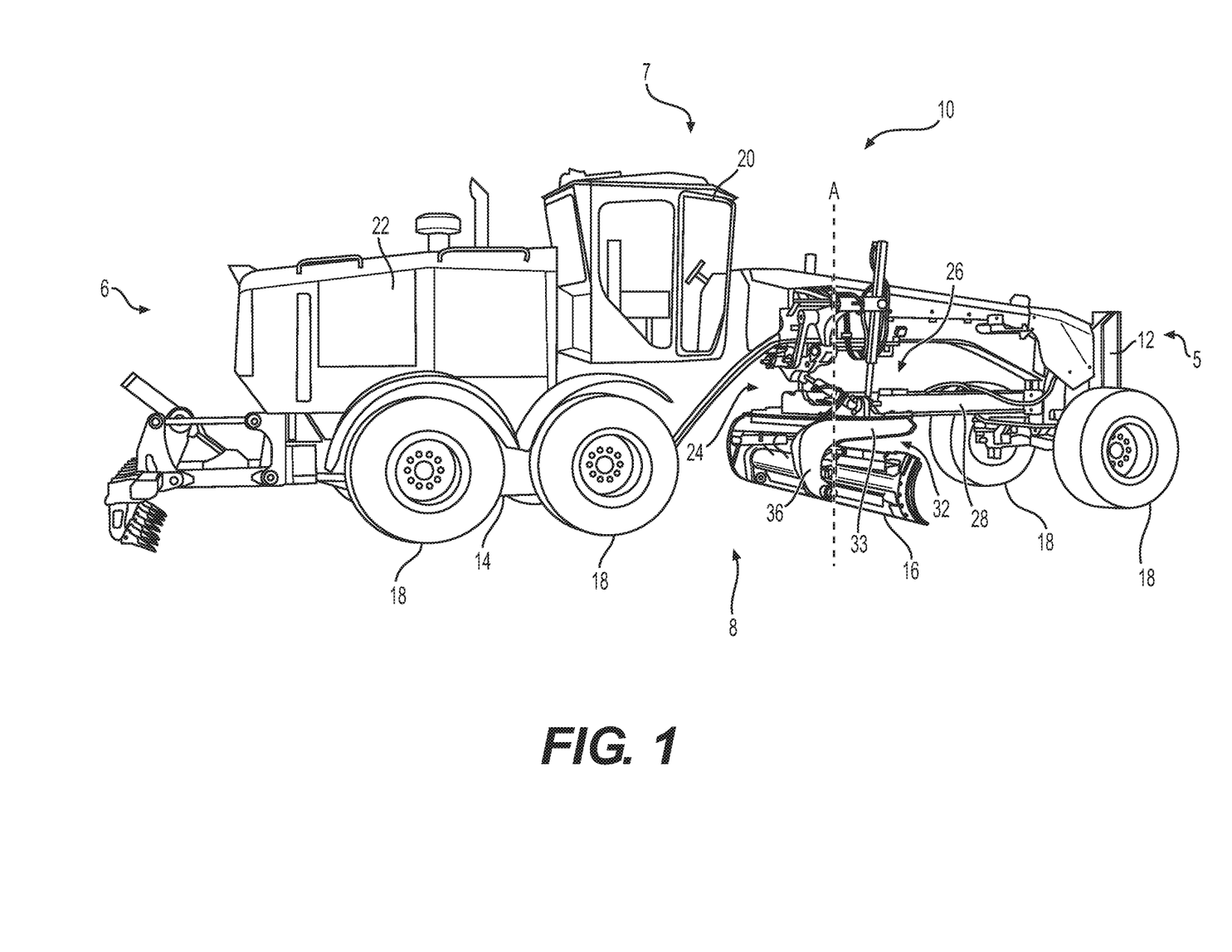
FIG. 1 is a perspective view of an exemplary grading machine, according to aspects of this disclosure.

FIG. 1 illustrates a perspective view of an exemplary motor grading machine 10, such as a motor grader, according to the present disclosure. Grading machine 10 may include a front end 5, a rear end 6, a top side 7, and a bottom side 8. Grading machine 10 includes a front frame 12, a rear frame 14, and a blade assembly 16. Front frame 12 and rear frame 14 are supported by wheels 18. An operator cab 20 may be mounted above a coupling of front frame 12 and rear frame 14. Rear frame 14 also includes an engine 22 to drive and/or power grading machine 10. Blade assembly 16 may include a blade, sometimes referred to as a moldboard, and is used to cut, spread, or level (collectively "sculpt") earth or other material traversed by grading machine 10. Blade assembly 16 is mounted on a linkage assembly, shown generally at 24. Linkage assembly 24 allows blade assembly 16 to be moved to a variety of different positions and orientations relative to grading machine 10, and thus sculpt the traversed ground surface in different ways.

As discussed below, linkage assembly 24 may include a drawbar assembly 26 and a circle assembly 32. Drawbar assembly 26 may include a drawbar 28 pivotably mounted to the front frame 12 with, for example, a ball joint (not shown). The position of drawbar assembly 26 may be controlled by one or more hydraulic cylinders for controlling a height, tilt, and/or lateral position of drawbar assembly 26 and blade assembly 16 relative to grading machine 10 and/or the ground surface to orient the blade assembly 16 for sculpting the ground surface. Further, circle assembly 32 may include a circle 33 having support arms 36 for coupling blade assembly 16 to circle 33 and thus, to circle assembly 32. Circle 33 may be rotated with respect to drawbar assembly 26 for rotating blade assembly 16. It is understood that blade assembly 16 may include any type of grading tool for sculpting the ground surface.

Figure 2:
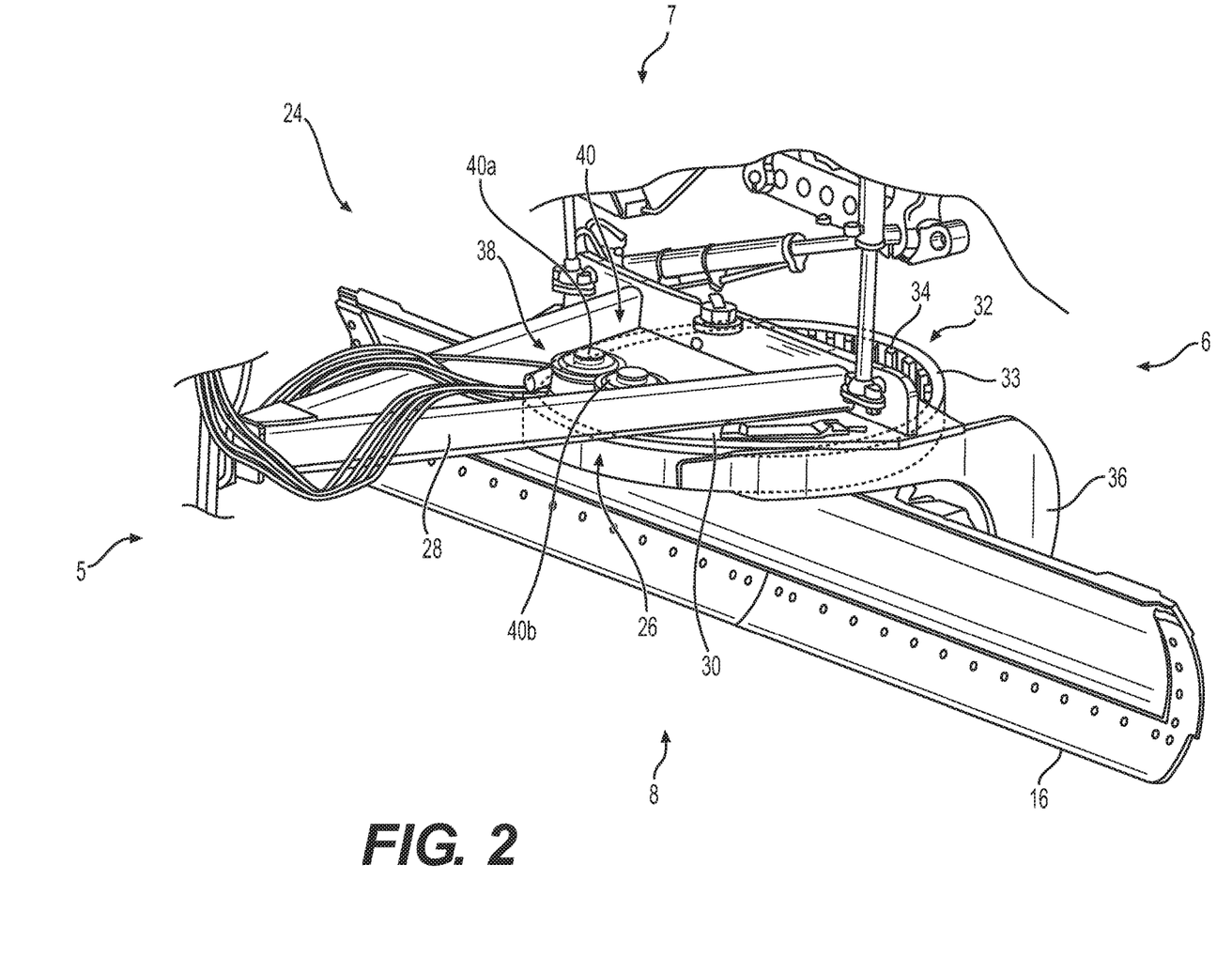
FIG. 2 is a front side perspective view of a linkage assembly of the grading machine of FIG. 1.

FIG. 2 is a front side 5 perspective view of the linkage assembly 24 of grading machine 10. As shown in FIG. 2, drawbar assembly 26 may further include a large, flat plate, commonly referred to as a yoke plate 30, coupled to the drawbar 28. Beneath yoke plate 30 is circle assembly 32. Circle assembly 32 may include a large gear, commonly referred to as a circle 33. Circle 33 includes a plurality of gear teeth 34 that extend along an inner face of circle 33. It is noted that FIG. 2 shows gear teeth 34 only on a portion of circle 33, but gear teeth 34 may extend along the entirety of the inner face of circle 33. Furthermore, yoke plate 30 may extend over an entire area of circle 33, but is shown as having a reduced size in FIG. 2 in order to expose a portion of circle 33 and gear teeth 34.

Circle assembly 32 and blade assembly 16 may be coupled via support arms 36 of circle 33 and a support plate (not shown). Circle 33, and thus blade assembly 16, may be rotated by circle drive assembly 38. Circle drive assembly 38 may include one or more circle drive motors 40 each including, for example, a circle drive pinion engaging with gear teeth 34. For example, the one or more circle drive motors 40 may include a first circle drive motor 40a and a second circle drive motor 40b. However, it is understood that circle drive assembly 38 may include a single circle drive motor 40 or more than two circle drive motors 40. The rotation of circle 33 by circle drive assembly 38 adjusts a circle angle and pivots blade assembly 16 about an axis A (FIG. 1) fixed to drawbar assembly 26 to establish a blade cutting angle. The blade cutting angle is defined as the angle of blade assembly 16 relative to front frame 12, and the blade cutting angle may be controlled by a combination of the position of circle 33 and the position of drawbar assembly 26.

Figure 3:
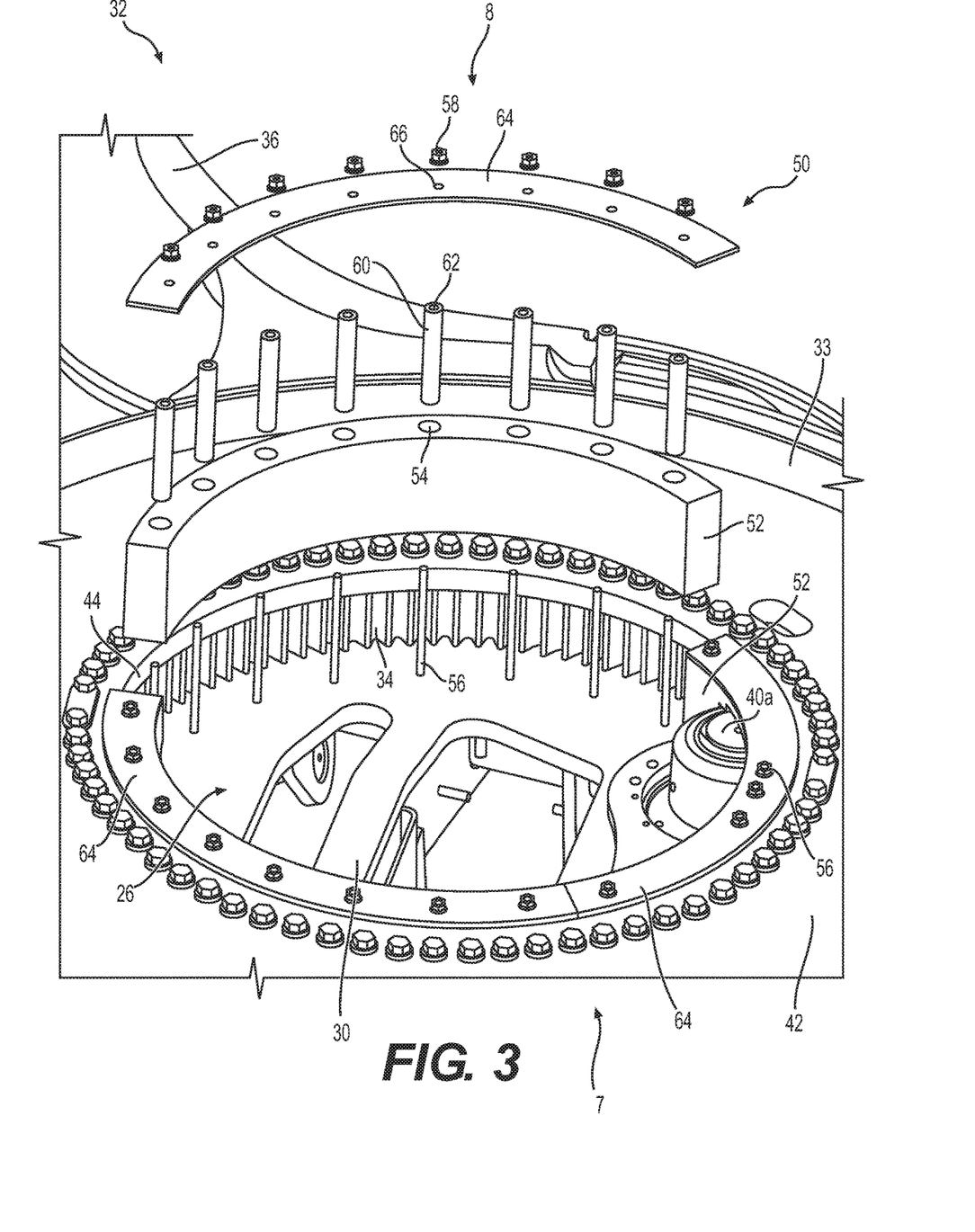
FIG. 3 is a bottom side perspective view of a circle assembly depicting a partially exploded view of an exemplary seal assembly for the grading machine of FIG. 1.

Additionally, grading machine 10 may include a seal assembly 50 (FIG. 3). It is noted that seal assembly 50 has been removed from FIG. 2 for clarity. Seal assembly 50 may be coupled to a bottom side 8 portion of the drawbar assembly 26 such that seal assembly 50 is positioned adjacent to a bottom side 8 portion of circle 33. Seal assembly 50 may cover at least a portion of circle 33, for example, gear teeth 34. In this aspect, seal assembly 50 may be coupled to drawbar 28 and/or yoke plate 30. As described below, seal assembly 50 may help enclose circle 33, including gear teeth 34, to protect components of circle assembly 32 from debris, such as dirt, rocks, or grease, that may otherwise accumulate and/or damage the circle 33, gear teeth 34, and/or a portion of circle drive system 38 (e.g., the circle drive pinion).

FIG. 3 is a bottom side 8 view of the circle assembly 32 depicting a partially exploded view of a seal assembly 50 for the grading machine 10. As shown in FIG. 3, circle assembly 32 may further include a bottom plate 42 that may cover gear teeth 34 when circle 33 is mounted. For example, circle 33 may be mounted between yoke plate 30 and bottom plate 42 such that circle 33 may be sandwiched or coupled to the drawbar assembly 26. Bottom plate 42 may be coupled to yoke plate 30 by coupling elements such as, for example, studs, bolts, screws or the like, which may include corresponding nuts or other coupling elements. Circle 33 may be supported vertically by one or more bearings (not shown), such as, for example, slide or plain bearings (e.g., metallic or plastic), roller bearings, or the like. Thus, circle assembly 32 may be coupled to drawbar assembly 26 such that circle 33, support arms 36, and blade assembly 16 may be rotated, with yoke plate 30, bottom plate 42, and the other components of the drawbar assembly 26 remaining stationary relative to the front frame 12.

The bottom plate 42 may generally face the ground surface during operation of grading machine 10. The bottom plate 42 may include a hole 44. Hole 44 may include a generally circular shape such that bottom plate 42 includes an inner circumference defined by the circumference of hole 44. The hole 44 may be sized such that the inner circumference of bottom plate 42 may correspond to a circumference formed by the gear teeth 34. As such, gear teeth 34 may be exposed by the hole 44.

Circle drive motors 40a, 40b may be mounted on drawbar assembly 26. It is noted that the view of FIG. 3 shows only one circle drive motor 40a and the second circle drive motor 40b is blocked from view by bottom plate 42 and cover plate 64, as detailed further below. Circle drive motors 40a, 40b may be mounted on yoke plate 30 and a portion of circle drive motors 40a, 40b may extend through a bottom side 8 surface of yoke plate 30. Circle assembly 32 may be mounted and coupled to drawbar assembly 26 such that the gears of circle drive motors 40a, 40b engage with gear teeth 34. Further, gear teeth 34 may extend from circle 33 to adjacent the bottom side 8 surface of yoke plate 30 without contacting yoke plate 30 such that gear teeth 34 may move with respect to yoke plate 30 and bottom plate 42 when circle 33 is rotated.

Seal assembly 50 may be mounted on a bottom side 8 of drawbar assembly 26. For example, seal assembly 50 may be mounted on the bottom side 8 surface of yoke plate 30. Seal assembly 50 may include a non-metallic seal component 52 extending circumferentially around the inner circumference of circle assembly 32 (e.g., around hole 44 of bottom plate 42). Thus, seal assembly 50 may include a generally annular, or ring, shape. The non-metallic seal component 52 may include rubber, polyurethane, other polymers, or any other type of non-metallic material known in the art. Accordingly, non-metallic seal component 52 may be compressed, as detailed further below. The non-metallic seal component 52 may include one or more holes 54 for receiving one or more fasteners 56 for coupling seal assembly 50 to drawbar assembly 26. It is noted that only one hole 54 and one fastener 56 are labelled for clarity. The holes 54 may extend axially through non-metallic seal component 52. For example, the holes 54 may extend entirely through non-metallic seal component 52. In the exemplary embodiment, the material of non-metallic seal component 52 may be uniform, such that non-metallic seal component 52 may include a generally elongated rectangular cross-sectional shape to form the annular shape of seal assembly 50. In one embodiment, non-metallic seal component 52 may include more material around holes 54 and less material between adjacent holes 54. Thus, weight may be reduced, while still providing structural support around holes 54. It is understood that non-metallic seal component 52 may include any amount of material and may include any shape or size for sealing gear teeth 34. The fasteners 56 may be coupled to yoke plate 30 when seal assembly 50 is assembled and mounted on the grading machine 10. The fasteners 56 may include, for example, studs, bolts, screws, or the like, and may include corresponding nuts 58 for fastening the fasteners 56.

Seal assembly 50 may further include one or more spacers 60. Spacers 60 may include a shape corresponding to a shape of holes 54 in seal component 52. For example, spacers 60 may include a generally cylindrical shape. As such, spacers 60 may be mounted within holes 54. Spacers 60 may further include holes 62 for receiving fasteners 56 such that fasteners 56 may be mounted through spacers 60 for coupling seal assembly 50 to yoke plate 30. It is noted that only one spacer 60 and one hole 62 is labelled for clarity. It is understood that holes 54, spaces 60, and holes 62 may be any shape or size, as necessary. Spacers 60 may be sized to provide a fixed and predetermined compression of non-metallic seal component 52, as detailed further below.

Seal assembly 50 may also include a cover plate 64. Cover plate 64 may be mounted on a bottom surface of the non-metallic seal component 52. Cover plate 64 may include a shape corresponding to a shape of non-metallic seal component 52. For example, cover plate 64 may include a generally annular, or ring, shape. Cover plate 64 may include any material as necessary, such as, for example, sheet metal, polymer, composite materials, other metals, or the like. Cover plate 64 may include one or more holes 66 for receiving the fasteners 56. For example, holes 66 may be aligned with holes 54 of non-metallic seal component 52 such that fasteners 56 may be inserted through holes 66 and into holes 54. It is noted that only one hole 66 is labelled for clarity. As such, cover plate 64 may be fastened to non-metallic seal component 52.

Thus, seal assembly 50 may include non-metallic seal component 52, spacers 60, fasteners 56, and cover plate 64. However, seal assembly 50 may include any number and/or combination of components. For example, seal assembly 50 may include only non-metallic seal component 52 and non-metallic seal component 52 may include other fastening means for mounting seal assembly 50 to drawbar assembly 26. It is understood that seal assembly 50 may include any number of holes 54, 62 and/or spacers 60. Further, holes 62 of spacers 60 and/or holes 66 of cover plate 64 may be threaded for receiving and engaging with corresponding threads of fasteners 56 for fastening fasteners 56 through holes 62, 66 to mount seal assembly 50 on grading machine 10. In one embodiment, cover plate 64 may be coupled directly to bottom plate 42 (e.g., be welding, fasteners, or the like) and non-metallic seal component 52 may be press fit between yoke plate 30 and cover plate 64. As such, fasteners 56 may extend only through cover plate 64 to bottom plate 42 or may not be included in seal assembly 50.

Figure 4:
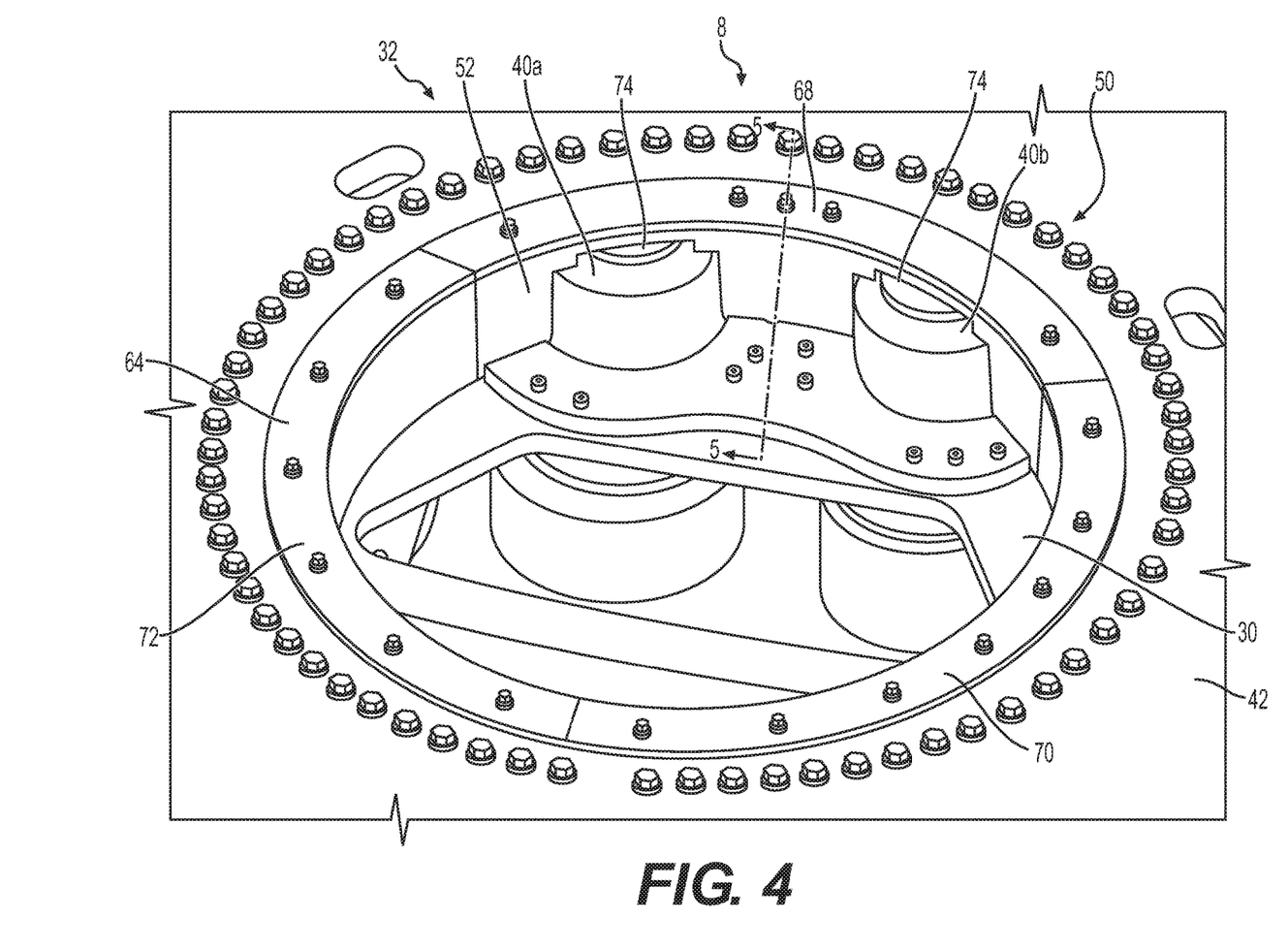
FIG. 4 is a bottom side perspective view of the circle assembly with the exemplary seal assembly of FIG. 3 assembled and mounted on the grading machine of FIG. 1.

FIG. 4 is a bottom side 8 perspective view of the circle assembly 32 with the seal assembly 50 assembled and mounted on the grading machine 10. As shown in FIG. 4, seal assembly 50 may be generally annular, or ring, shaped.

Further, seal assembly 50 may include two or more arc segments. For example, seal assembly 50 may include a first arc segment 68, a second arc segment 70, and a third arc segment 72 as shown in FIG. 4. As such, non-metallic seal component 52 and/or cover plate 64 may be segmented accordingly. It is understood that seal assembly 50 may include any number of segments and each segment may be any length as necessary. For example, in one embodiment, seal assembly 50 may not be segmented such that non-metallic seal component 52 and cover plate 64 are single annular components. As further shown in FIG. 4, seal assembly 50 may provide a seal for circle drive motors 40*a*, 40*b*. For example, a portion of non-metallic seal component 52 may include one or more cutouts 74 having a shape corresponding to a shape of the circle drive motors 40*a*, 40*b*. As such, when seal assembly 50 is assembled and mounted on grading machine 10, cutouts 74 may be placed around circle drive motors 40*a*, 40*b* such that non-metallic seal component 52 may seal the circle drive motors 40*a*, 40*b*.

Figure 5:
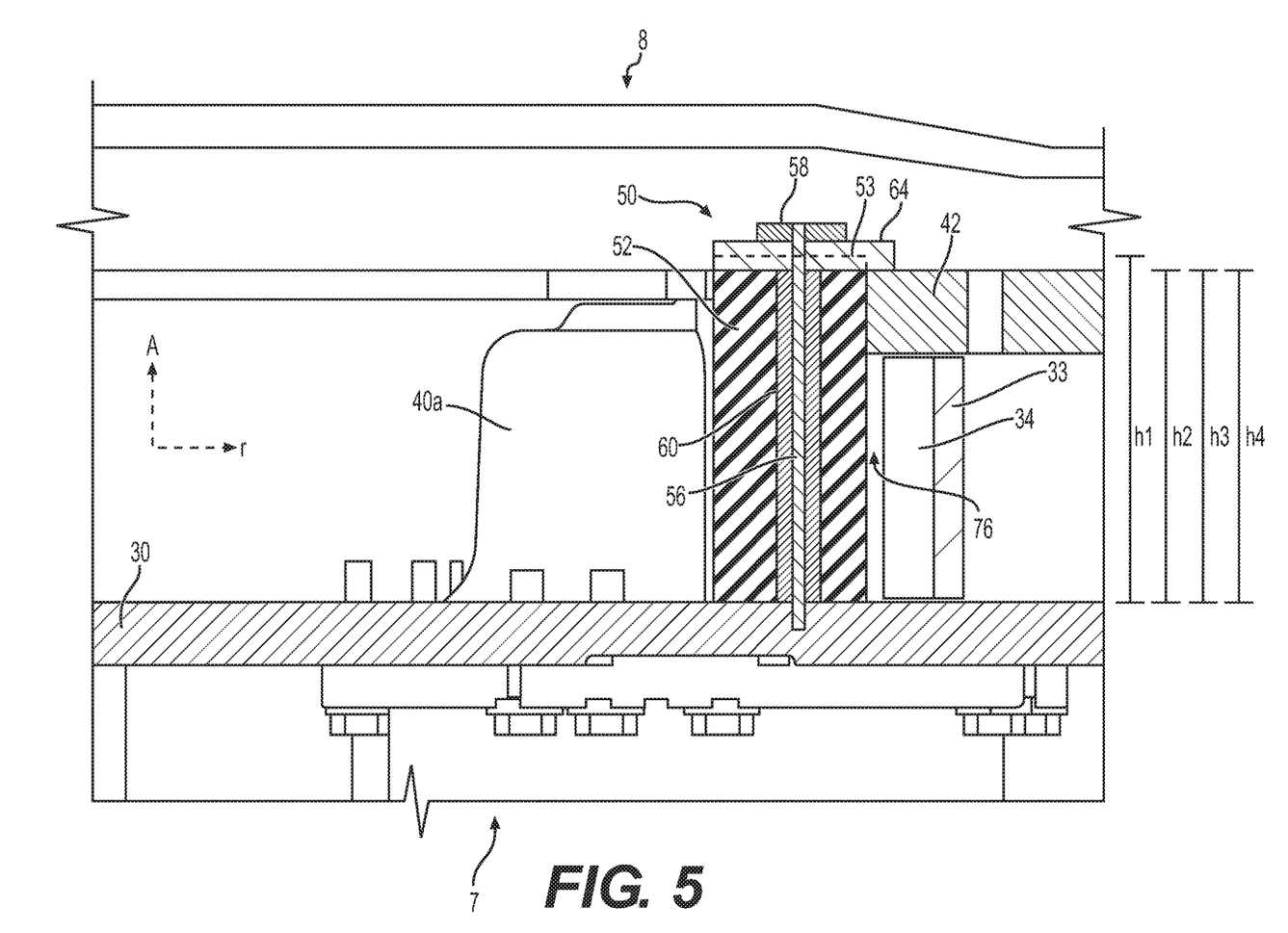
FIG. 5 is a bottom side cross-sectional view of the seal assembly of FIGS. 3 and 4.

FIG. 5 is a bottom side 8 cross-sectional view along line 5-5 in FIG. 4 of the exemplary seal assembly 50 in an assembled state. The cross-section may be defined by the axis, A, and a radial direction, r, perpendicular to axis A. As shown in FIG. 5, the non-metallic seal component 52 may include a generally rectangular cross-section. Further, in FIG. 5, a gear tooth 34 extending from circle 33 is shown schematically for clarity. When seal assembly 50 is assembled, the non-metallic seal component 52 may form a circumferential gap 76 between the seal assembly 50 and the gear teeth 34. The non-metallic seal component 52 may contact, and extend from, the bottom side 8 surface of the yoke plate 30. Fastener 56 may be fastened to yoke plate 30 by, for example, a threaded hole, and may be secured via a nut 58. It is understood that fasteners 56 may extend entirely through yoke plate 30 and may include a second nut (not shown) on a top side 7 to secure fasteners 56 to yoke plate 30.

As further shown in FIG. 5, cover plate 64 may extend in the radial direction over the bottom side 8 surface of bottom plate 42. Further, non-metallic seal component 52 may include a non-compressed state (shown by dashed lines 53) and may be compressed to a compressed state (as shown by the solid lines of non-metallic seal component 52 in FIG. 4) when seal assembly 50 is assembled and mounted on grading machine 10. Non-metallic seal component 52 may include a non-compressed height h1 and a compressed height h2. Non-compressed height h1 of non-metallic seal component 52 may be greater than a height h3 defined from the bottom side 8 surface of yoke plate 30 to a bottom side 8 surface of bottom plate 42. When seal assembly 50 is assembled and mounted, non-metallic seal component 52 may be compressed to the compressed height h2. For example, fasteners 56 may exert a force on cover plate 64 which may exert a force on non-metallic seal component 52 such that non-metallic seal component 52 is compressed by cover plate 64 and fasteners 56 when fasteners 56 are fastened. As such, the height h2 of non-metallic seal component 52 in the assembled state may be the same, or substantially similar, to the height h3 from yoke plate 30 to bottom plate 42.

When seal assembly 50 is assembled and mounted, cover plate 64 may contact the bottom side 8 surface of circle assembly 32. For example, cover plate 64 may contact bottom plate 42 when seal assembly 50 is assembled. Thus, a seal may be formed between seal assembly 50 and circle 33. In an alternative embodiment to that shown in FIG. 5, cover plate 64 may include a radial length that is the same, or substantially similar, to a radial length of non-metallic seal component 52 such that cover plate 64 is radially coextensive with seal component 52 and does not extend radially over a surface of bottom plate 42. As such, when seal assembly 50 is assembled and mounted, non-metallic seal component 52 may be compressed such that cover plate 64 is flush with the bottom side 8 surface of bottom plate 42. Further, a lateral surface of non-metallic seal component 52 may contact a lateral surface of bottom plate 42 (as shown in FIG. 5). However, in some embodiments, the compressed height h2 may be less than the height h3 such that non-metallic seal component 52 does not contact the lateral surface of bottom plate 42.

Further, spacers 60 may include a height h4 that is the same, or substantially similar, to the height h3 from yoke plate 30 to bottom plate 42. As such, spacers 60 may provide a limit or stop to the amount of compression of non-metallic seal component 52 when seal assembly 50 is assembled and mounted. For example, cover plate 64 may be lowered to abut an end of spacers 60 when non-metallic seal component 52 is compressed such that cover plate 64 is unable to move beyond spacers 60. Thus, spacers 60 may define a predetermined height of compression of non-metallic seal component 52. As such, spacers 60 may ensure a fixed and predetermined compression of seal component 52 and ensure that cover plate 64 is flat (e.g., parallel, or substantially parallel with bottom plate 42) when fasteners 56 are fastened and seal assembly 50 is assembled. It is understood that height of spacers 60 may be less than height h3 such that compressed height h2 of non-metallic seal component 52 may be less than height h3.

Figure 6:
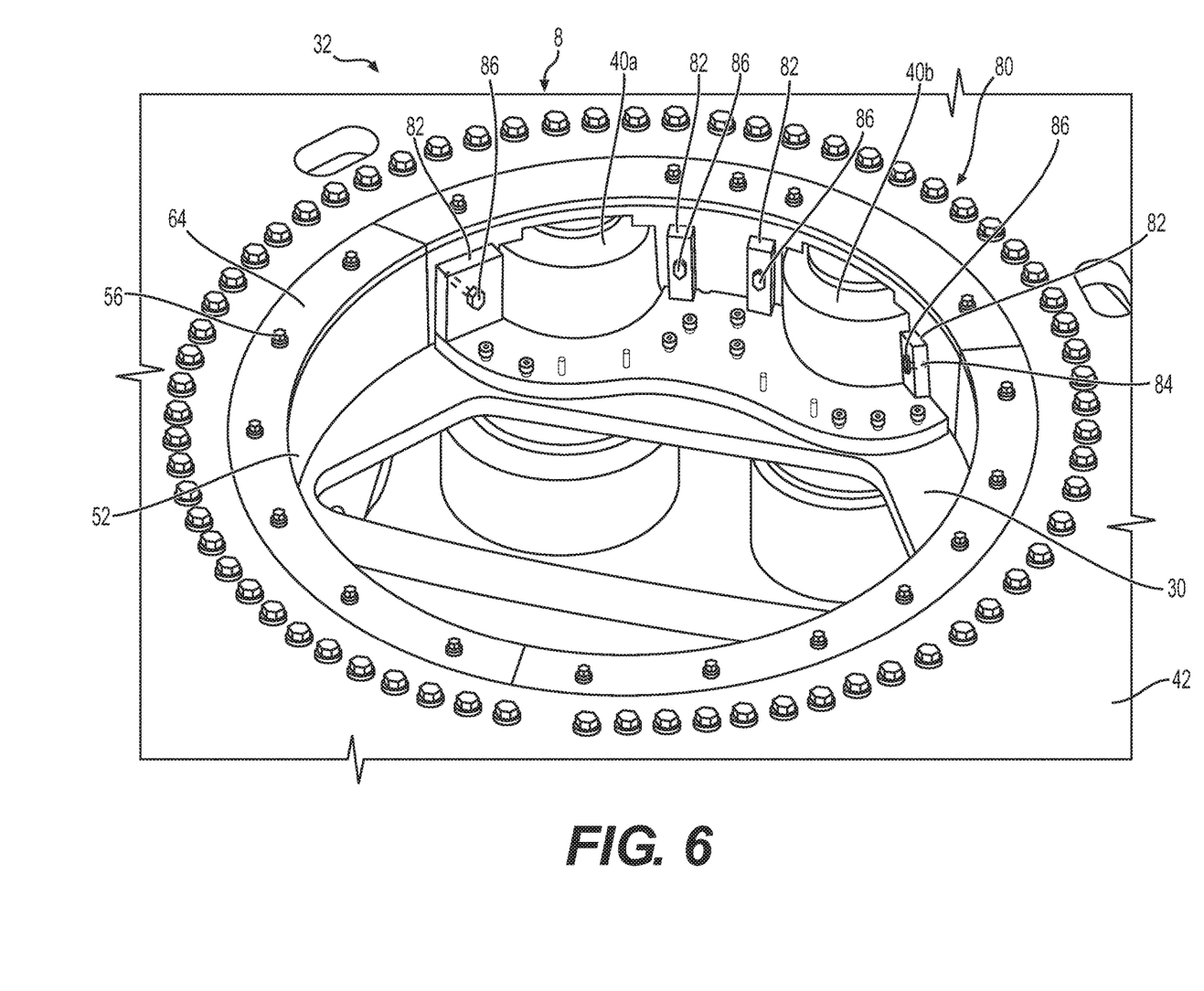
FIG. 6 is a bottom side perspective view of the circle assembly with an exemplary seal assembly, according to another embodiment, assembled and mounted on the grading machine of FIG. 1.

FIG. 6 is a bottom perspective view of the circle assembly 32 with an exemplary seal assembly 80, according to another embodiment, assembled and mounted on grading machine 10. As shown in FIG. 6, seal assembly 80 may be substantially similar to seal assembly 50. For example, seal assembly 80 may be substantially annular, or ring shaped, and may include a non-metallic seal component 52, a cover plate 64, one or more spacers (not shown in FIG. 6), and one or more fasteners 56. Seal assembly 80 may further include one or more mounting blocks 82 for mounting seal assembly 80 to drawbar assembly 26. The mounting blocks 82 may be spaced apart from gear teeth 34 (not shown in FIG. 6) and may be coupled to the bottom side 8 surface of yoke plate 30. Mounting blocks 82 may be coupled to yoke plate 30 by welding, fasteners, or any other coupling means known in the art. Mounting blocks 82 may include one more holes 84 extending radially through mounting blocks 82. Non-metallic seal component 52 may be mounted between gear teeth 34 and mounting bocks 82. Non-metallic seal component 52 may further include one or more holes (not shown) extending radially through non-metallic seal component 52. The holes of non-metallic seal component 52 may be aligned with holes 84 of mounting blocks 82. One or more second fasteners 86 may be inserted into holes 84 and the holes of non-metallic seal component 52 for coupling non-metallic seal component 52 to drawbar assembly 26 (e.g., to yoke plate 30). It is understood that seal assembly 80 may include any number of mounting blocks 82 and/or any number of fasteners 86 for coupling non-metallic seal component 52 to drawbar assembly 26.

INDUSTRIAL APPLICABILITY

The disclosed aspects of grading machine 10 may be used in any grading or sculpting machine to provide a seal for gear teeth 34 of a circle assembly 32.

During operation of grading machine 10, an operator may desire to rotate blade assembly 16 to a blade cutting angle for a grading operation. Accordingly, circle drive assembly 38 may rotate circle 33 with respect to drawbar assembly 26. During the grading operation, debris, such as dirt, rocks, grease, or the like, may enter circle assembly 32 (e.g., through hole 44 of bottom plate 42). Seal assembly 50, 80 may seal gear teeth 34 from the debris. For example, seal assembly 50, 80 may help to prevent dirt and/or rocks from damaging gear teeth 34. Further, seal assembly 50, 80 may help to enable gear teeth 34 to be greased without grease escaping from gear teeth 34 and/or may prevent debris from accumulating in the grease. Non-metallic seal component 52 may provide a durable seal such that debris that may strike or otherwise hit non-metallic seal component 52 may not dent, bend, or substantially damage non-metallic seal component 52. Thus, the seal between seal assembly 50, 80 and gear teeth 34 may not be easily broken. Additionally, seal assembly 50, 80 may be easily replaceable such that damage to gear teeth 34 may be prevented if seal assembly 50, 80 is broken or otherwise damaged.

It will be apparent to those skilled in the art that various modifications and variations can be made to the disclosed machine without departing from the scope of the disclosure. Other embodiments of the machine will be apparent to those skilled in the art from consideration of the specification and practice of the seal assembly for a grading machine disclosed herein. It is intended that the specification and examples be considered as exemplary only, with a true scope of the disclosure being indicated by the following claims and their equivalents.

What is claimed is:

1. A grading machine, comprising:
    A machine body;
    A blade assembly;
    A circle assembly supporting the blade assembly and including a circle having a plurality of gear teeth, a top surface and a bottom surface, wherein an axial direction extends between the top surface and the bottom surface;
    A drawbar assembly connecting the circle assembly to the machine body of the grading machine; and
    A seal assembly including a non-metallic seal component that covers an inner circumference of the circle assembly for sealing the plurality of gear teeth, the non-metallic seal component being coupled to and contacting a surface of a bottom side portion of the drawbar assembly, wherein the non-metallic seal component is compressed in the axial direction.

2. The grading machine of claim 1, wherein the non-metallic seal component forms an enclosed gap between the non-metallic seal component and the plurality of gear teeth.

3. The grading machine of claim 1, further including a circle drive motor for rotating the circle relative to the drawbar assembly, wherein the non-metallic seal component includes a cut out having a shape corresponding to a shape of the circle drive motor for sealing the circle drive motor.

4. The grading machine of claim 1, wherein the non-metallic seal component is compressed in the axial direction to a predetermined height.

5. The grading machine of claim 4, wherein the seal assembly further includes one or more spacers mounted within the non-metallic seal component and having an end defining the predetermined height.

6. The grading machine of claim 4, wherein the seal assembly further includes a cover plate mounted on the non-metallic seal component and the non-metallic seal component is compressed by the cover plate.

7. The grading machine of claim 6, wherein the cover plate extends radially over a surface of the circle assembly and contacts the surface when the non-metallic seal component is compressed.

8. The grading machine of claim 1, wherein the seal assembly further includes one or more fasteners extending through the non-metallic seal component for mounting the seal assembly on the bottom side portion of the drawbar assembly.

9. The grading machine of claim 1, wherein the non-metallic seal component includes two or more arc segments.

10. A circle assembly for a grading machine, comprising:
a circle of the grading machine having a plurality of gear teeth disposed about an inner circumference of the circle; and
a seal assembly including a non-metallic seal component circumferentially covering the inner circumference of the circle assembly such that an outer surface of the non-metallic seal component faces the plurality of gear teeth, across a circumferentially-extending gap, for sealing the plurality of gear teeth, wherein the non-metallic seal component is compressed axially to a predetermined height when the seal assembly is mounted.

11. The circle assembly of claim 10, wherein the non-metallic seal component has a non-compressed height that is greater than a height of the circle assembly.

12. The circle assembly of claim 10, wherein the seal assembly further includes one or more spacers mounted within the non-metallic seal component and having an end defining the predetermined height.

13. The circle assembly of claim 10, wherein the seal assembly further includes a cover plate mounted on the non-metallic seal component and the non-metallic seal component is compressed by the cover plate.

14. The circle assembly of claim 13, wherein the cover plate extends radially over a surface of the circle assembly and contacts the surface when the non-metallic seal component is compressed.

15. The circle assembly of claim 10, wherein the seal assembly further includes one or more fasteners extending through the non-metallic seal component for mounting the seal assembly on a drawbar assembly.

16. A seal assembly for a grading machine, comprising:
a non-metallic seal component shaped to circumferentially cover a radially inner-most circumference of a circle assembly of the grading machine, the non-metallic seal component including at least one first hole; and
a cover plate shaped to extend circumferentially around the radially inner-most circumference of the circle assembly of the grading machine, wherein the cover plate includes at least one second hole that aligns with the at least one first hole when the cover plate is mounted on an end of the non-metallic seal component.

17. The seal assembly of claim 16, wherein the non-metallic seal component is sized to be compressed axially to a predetermined height by the cover plate in an assembled state.

18. The seal assembly of claim 17, wherein the non-metallic seal component and cover plate are formed of a plurality of segments.

19. The seal assembly of claim 16, wherein the seal assembly further includes one or more spacers mounted within the non-metallic seal component.

20. The seal assembly of claim 16, wherein the seal assembly further includes at least one fastener extending through the at least one second hole of the cover plate and the at least one first hole of the non-metallic seal component for mounting the seal assembly on a drawbar assembly of the grading machine.

* * * * *